United States Patent
Arumaithurai et al.

(10) Patent No.: US 8,260,889 B2
(45) Date of Patent: Sep. 4, 2012

(54) DYNAMIC DISCOVERY OF QUALITY OF SERVICE NODES

(75) Inventors: Mayutan Arumaithurai, Gottingen (DE); Hannes Tschofenig, Espoo (FI)

(73) Assignee: Nokia Siemens Networks Oy, Espoo (FI)

(*) Notice: Subject to any disclaimer, the term of this patent is extended or adjusted under 35 U.S.C. 154(b) by 208 days.

(21) Appl. No.: 12/918,526

(22) PCT Filed: Mar. 25, 2008

(86) PCT No.: PCT/EP2008/002349
§ 371 (c)(1),
(2), (4) Date: Aug. 20, 2010

(87) PCT Pub. No.: WO2009/118023
PCT Pub. Date: Oct. 1, 2009

(65) Prior Publication Data
US 2010/0332628 A1  Dec. 30, 2010

(51) Int. Cl.
*G06F 15/177* (2006.01)
*G06F 15/173* (2006.01)

(52) U.S. Cl. ........ 709/220; 709/226; 709/234; 370/232; 370/230; 370/253; 370/233; 370/229; 370/236; 370/234

(58) Field of Classification Search .................. 709/220, 709/226
See application file for complete search history.

(56) References Cited

U.S. PATENT DOCUMENTS

| 6,968,389 B1* | 11/2005 | Menditto et al. ............... 709/233 |
| 6,981,029 B1 | 12/2005 | Menditto et al. |
| 2005/0021803 A1 | 1/2005 | Wren |
| 2006/0106802 A1 | 5/2006 | Giblin |
| 2007/0226273 A1 | 9/2007 | Rath et al. |
| 2008/0107092 A1* | 5/2008 | Taaghol et al. ............... 370/338 |

FOREIGN PATENT DOCUMENTS

| EP | 1381190 | 1/2004 |
| WO | 2007/016707 | 2/2007 |

OTHER PUBLICATIONS

E. Rescorla, HTTP Over TLS, Network Working Group, RFC 2818, May 2000, a total of 7 pages.
T. Berners-Lee, Uniform Resource Identifier (URI) : Generic Syntax, Network Working Group, RFC 386, Jan. 2005, a total of 61 pages.
M. Barnes, Ed./Nortel, HTTP Enabled Location Delivery (HELD) draft-ietf-geopriv-http-location-delivery-04.txt, GEOPRIV WG, Jan. 14, 2008, a total of 41 pages.
R. Droms, Ed., Dynamic Host Configuration Protocol for IPv6 (DHCPv6), Network Working Group, RFC 3315, Jul. 2003, a total of 51 pages.
R. Rosenberg, SIP: Session Initiation Protocol, Network Working Group, RFC 3261, Jun. 2002, a total of 269 pages.

* cited by examiner

*Primary Examiner* — Jude Jean Gilles
(74) *Attorney, Agent, or Firm* — Squire Sanders (US) LLP

(57) ABSTRACT

A method of using a computer network for Dynamic Discovery of Quality of Service Nodes is provided. The method comprises requesting for a level of Quality of Service (QoS) of communication for a service of an Internet Service Provider (ISP) by a Application Service Provider (ASP). The request is based on a Quality of Service by Reference (QoSbyR) information that is received by the ASP from a user. The QoSbyR information comprises a ISP location information and a level of Quality of Service information.

17 Claims, 2 Drawing Sheets

DYNAMIC DISCOVERY OF QUALITY OF SERVICE NODES

Figure 1:
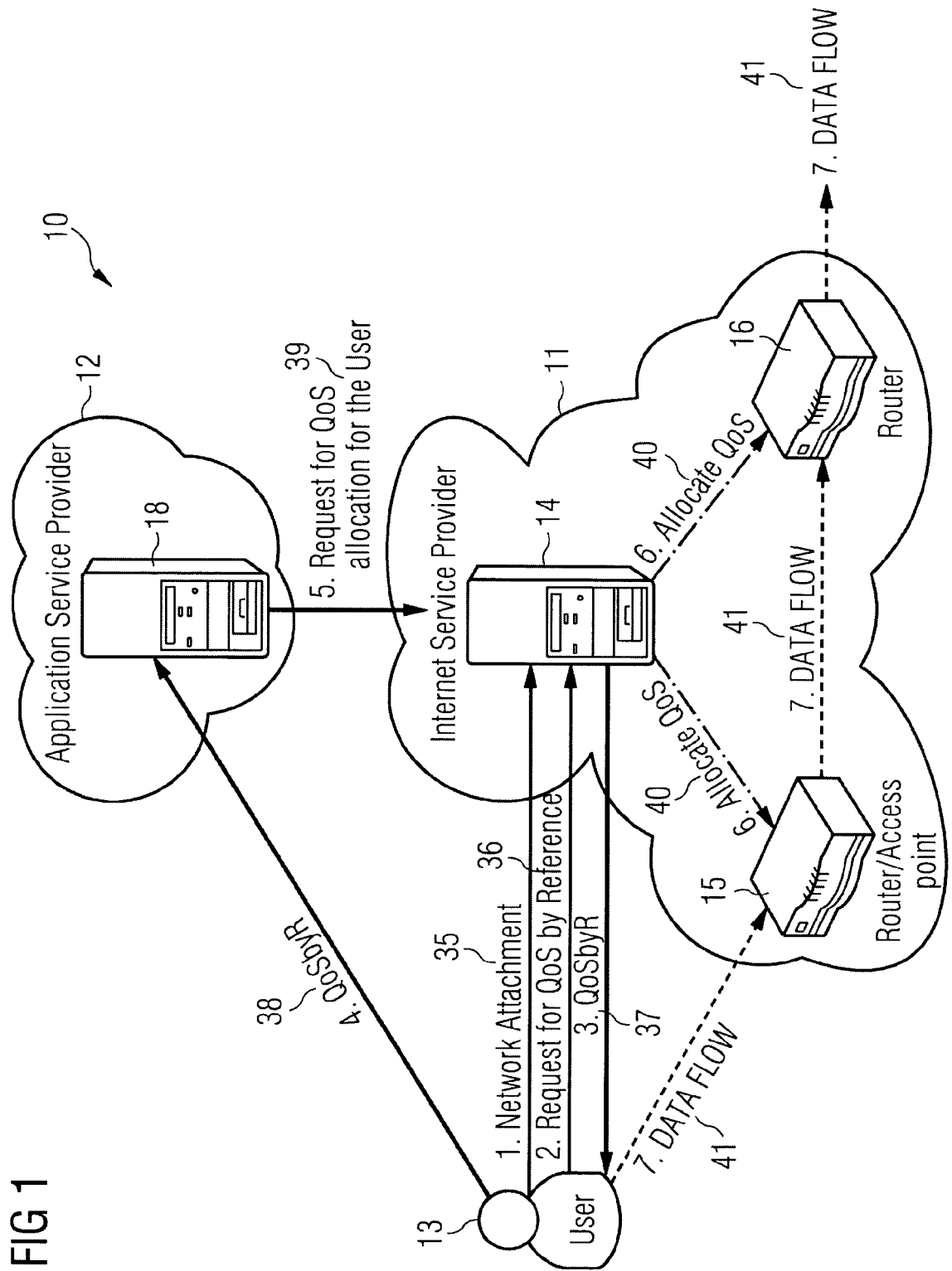

The application is related to Quality of Service (QoS) of communication for a computer network. In particular, the application is related to a method for a user to obtain a certain degree of the QoS from an Application Service Provider (ASP) in the computer network.

The Internet is a decentralized network of computers that can communicate with one another via the Internet protocol (IP). The Internet has its origins in a network created by the Advanced Research Project Agency (ARPA) in the 1960's.

It has recently become a worldwide communication medium. The explosive growth in use and in traffic over the Internet is largely due to the development in the early 1990's of the World-Wide-Web (WWW), which is one of several service facilities provided on the Internet.

Other facilities of the Internet include communication services, information search services, as well as information retrieval services.

The communication services include electronic mail, telnet, use-net newsgroups, and internet relay chat (IRC) whilst the information search services comprises WAIS (Wide Area Information Servers) and Archie. The information retrieval services include FTP (file transfer protocol) and Gopher. The Gopher is a system for retrieving information and files from the Internet. The Archie is a search tool that retrieves specific files stored on anonymous FTP sites The application provides a method of using a computer network.

It is believed that a user's Internet Service Provider (ISP) has information about a Quality of Service (QoS) of communication that the user can avail. This can be a pre-provisioned QoS information in which the QoS information is provided before it is needed by a user or a dynamically provisioned QoS information in which the QoS information is provided when it is needed by the user.

A QoS by reference (QoSbyR) information can be transferred from an Internet Service Provider (ISP) to an end host and from the end host to an Application Service Provider (ASP) is provided. The QoSbyR may be transferred using an URI (Uniform Resource Identifier). The QoSbyR information is also called QoSbyR value.

The QoS refers to a service quality of a data packet service or a performance of the data packet service. The service quality can be for a perceived quality by a user of the service, such an acceptable maximum number of lost data packets during data transmission. The performance of the data packet service can refer to a control mechanism of resource for prioritizing data-packet traffic.

The level of QoS relates to a priority setting of the data packet traffic for determining a certain performance level of the data packet traffic. The performance level can refer to bit rate, delay, jitter, packet-dropping probability, or bit-error rate setting. The data packet traffic can be support applications, users, or data flows. An acceptable level of QoS is especially important for real-time applications, such as voice over IP (Internet Protocol).

The QoSbyR information points to a certain address, which may be in URI format, and is for referencing the address to transfer a QoS information or to set a predetermined level of QoS.

The ISP is an entity that provides its subscriber with Internet access. The entity can be an organisation or company with equipments for accessing the Internet. The entity may communicate with its subscriber via its network device to a corresponding network device of the subscriber or via an employee of the ISP to the subscriber.

The subscriber is sometimes called a user. The user refers to a human being or a human being with a computing device for communicating with the ISP.

The end host is a computing device or a network node, such as a router. The end host can, in certain situation, relates to a user.

The ASP provides computer-based services to the user over a network, such as the Internet or a local area network. The service can in the form of booking of airline tickets or online words processing. The service can operate on a pay-as-you-go basis.

The user can obtain the QoS by reference (QoSbyR) information from its ISP. This may be obtained during a network attachment when the user is connected to the ISP. It may also be obtained on an on-demand basis or on a when-needed basis. The user can pass the QoSbyR information to the ASP when the user requires a provision of a certain level of the QoS. The ASP may use the QoSbyR information to locate the ISP, a QoS policy server in the domain of the ISP, or a specific end host for requesting allocation of the required level of QoS.

A method of using the computer network comprises requesting for a level of Quality of Service (QoS) of communication for a service of the Internet Service Provider (ISP) by an Application Service Provider (ASP). The request is based on a Quality of Service by Reference (QoSbyR) information that is received by the ASP from a user. The QoSbyR information comprises an ISP-location information and a level of QoS information. The location information is a form of an address, such as an Internet Protocol address.

This method provides a means for the ASP to request for the level of QoS from the ISP. The ASP is usually unaware of an address or a location of the ISP of the user. In particular, the ASP is mostly unaware of the address of the ISP for requesting the level of QoS of communication from the ISP. The level of QoS can be for a service of the ASP for the user. The method allows the ASP to discover or be aware of address of service nodes of the ISP for requesting the level of QoS. The service node can be a in the form of a QoS policy server.

The method can comprise the further step of requesting for the QoSbyR information by the user to the ISP and of providing the QoSby information by the ISP to the user. The user may generate the request when the user needs a certain level of performance of the service of the ASP, such as a certain quality level of signal transmission for an online video download. The QoSbyR information may be provided to the user during attachment of the user to the ISP or after attachment of the user to the ISP.

The QoSbyR information can be provided using a URI (Uniform Resource Identifier) format. In this case, a subdomain of the URI would be used for setting the level of QoS.

The method can comprise the further step of allocating of a resource by the ASP to the service.

The allocation of the resource is for providing a certain level of performance to the service. The allocation of the resource relates to priority setting of a data-packet traffic. An example of the resource is a data bandwidth for a service, such as video transmission.

The resource can include resources of a neighbouring domain, which ISP has a Service Level Agreement with the neighbouring domain. This allows an unhindered level of QoS of the service for the user over different domains.

The method can also comprise the further step of providing the QoSbyR information to the ASP by the user, allocating of the resource by the ISP to the service, and receiving the service with the level of QoS by the user. The user facilitates the transfer of the QoSbyR information from the ISP to the ASP. The user can provide the QoSbyR information to the ASP by an end-host, which can be in a form of computing device with a software program or module for performing the transfer of the QoSbyR information. The software program receives the QoSbyR information from the ISP and then forwards the QoSbyR information to the ASP. The ASP later receives the QoSbyR information, determines the ISP location from the QoSbyR information. The ISP location can relate to an address of a QoS policy server of the ISP. Later, the ISP or more specifically a host of the ISP, such as the QoS policy server, allocate the resource to the service of the ASP.

Thus, the method enables an arbitrary ASP to provide a service to a user with a certain level of QoS. The service may use a business agreement between the user and the ISP. No prior agreement between an ISP of a user and the ASP is required. Any malicious node that may be located along a transmission path is prevented from changing the transmitted QoSbyR information as the ASP directly requests for the level of QoS from the ISP of the user. Additionally, an off-path adversary cannot guess the reference as it can contain a random component. This random component and the need to protect the QoSbyR information in transit are important for the security of the overall system.

A computer network is also provided. The computer network comprises an Application Service Provider (ASP), an Internet Service Provider (ISP), the ISP being communicatively connected to the ASP, and a plurality of routers. The routers are communicatively connected to the ISP. The ASP is configured to request a level of Quality of Service (QoS) of communication for a service of the ASP from the ISP based on a QoS by reference (QoSbyR) information from a user. The user is communicatively connected to the ASP. The QoSbyR information comprises the level of QoS information and a location of the ISP information.

The ISP is connected to the ASP and to the routers by communication links, which can include fibre link or Ethernet cable. The router receives data packets and forwards the data packets to its destination. The routers can grant certain data-packet flow higher priority based on a request from the ASP.

The ISP location information can comprise a location-information of an end-host. The ISP location information can also comprise a location-information of a QoS policy server. The ISP location information points to an address of the ISP and it is used for informing the ASP of the address. This enables the ASP to discover the address, without which the ASP is usually unaware of the address. The address can refer to an end-host. In particular, the end-host can be a QoS policy server for ascertaining whether the service can have the resource and for allocating the resource to the service.

The level of QoS information and a location of the ISP information can be in the form of an opaque reference. The opaque reference is a type of pointer wherein its address is not shown, or its internal implementation is hidden.

The ISP can be configured to provide the QoSbyR information to the user. The end host of the ISP can perform the provision of the QoSbyR information to the user.

The ASP can be further configured to receive the QoSbyR information from the user. The ISP can be further configured to adapt the routers to provide the level of QoS for the service. The ISP can also be further configured to adapt at least one router of a neighbour domain to provide the level of QoS for the service.

Figure 2:
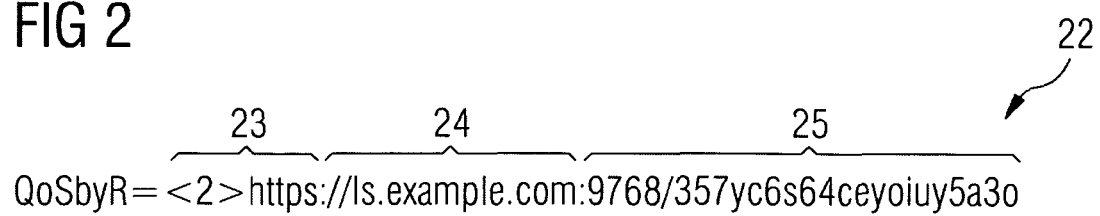
Figure 3:
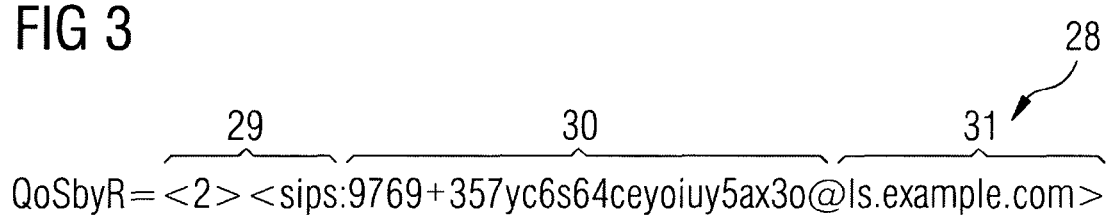

FIG. 1 illustrates a computer network wherein a Quality of Service by reference (QoSbyR) information is delivered based on out-of-band agreements, FIG. 2 illustrates a HTTPS (Hypertext Transfer Protocol over Secure Socket Layer) URI (Uniform Resource Identifier) that comprises the QoSbyR information of FIG. 1, and FIG. 3 illustrates a SIPS (Secure Session Initiation Protocol) URI that comprises the QoSbyR information of FIG. 1.

FIG. 1 depicts a computer network 10. The computer network 10 has an Internet Service Provider (ISP) network 11 and an Application Service Provider (ASP) network 12 that is connected to the ISP network 11. A user 13 is connected the ISP network 11 and to the ASP network 12.

The ISP network 11 has an ISP 14 that is connected to a router 15 and a router 16. The ISP 14 includes an end host and a QoS server. The end host, is provided here, as a computing device. The QoS server is also called QoS policy server. The router 15 is placed at an access point. The router 15 is connected to the router 16 whilst the router 16 is connected to another communication node. The other communication node is not shown in the FIG. 1. The ISP 14 is connected to an Application Service Provider (ASP) 18 of the ASP network 12. The user 13 has communication links with the ISP 14, the ASP 18, and the router 15.

The computer network 10, as provided here, delivers a Quality of Service by reference (QoSbyR) information that govern handling of the QoSbyR information among the user 20, the ISP 14, and the ASP 18. The QoS server is for controlling QoS functions.

The QoSbyR information includes a location-information of the ISP 14 and a level of QoS information of communication. The Quality of Service (QoS) refers to a control mechanism of resource for prioritizing data-packet traffic. The resource includes the routers 15 and 16. The location information is in the form of an Internet Protocol address.

The ISP 14 provides access of the Internet or of a local area network for its subscribers. The ISP 14 has an extension to provide the QoSbyR information to the user 13.

The ASP 18 provides services for the user 13. The services include software applications. The ASP 18 has an extension to receive the QoSbyR information from the user 13 and to utilize the QoSbyR information to request a level of QoS from the ISP 14.

The user 13 may be the subscriber of the ISP 14. The user 13 can be a person or an entity that receives benefit of the service that is provided by the ASP 18. The user 13 receives the QoSbyR information from the ISP 14 and delivers the QoSbyR information to the ASP 18.

The router 15 receives data packets from the user 13 or the ISP 14 and forwards them to their destinations. Similarly, the route 16 receives data packets from the router 15 or the ISP 14 and forwards them to their destinations.

The access point is for transmitting data packets among the user 13, the ISP 14, and the router 16.

A method for using the computer network 10 is shown below. The method commences with network attachment by the user 13 for accessing the ISP 14, as shown in step 35 of FIG. 1. The user 13 later requests for a QoSbyR value from the ISP 14, as shown in step 36 of FIG. 1. The QoSbyR value is also called QoSbyR information. The request can occur when the user 13 starts accessing the ISP 14 or any time later.

Afterwards, the ISP 14 provides the QoSbyR value to the user 13. This is depicted in step 37 of FIG. 1. The QoSbyR value is an opaque reference that points to the ISP, the QoS server within the ISP's network and a reference to the end host for requesting the ISP 14 to allocate the required level of QoS.

The user 13 then sends the QoSbyR value to the ASP 18, when the user 13 requires the service from the ASP 18 with a certain level of QoS. This is shown in step 38 of FIG. 1.

The ASP 19 later uses the location information of the ISP 14 from the QoSbyR value to locate the end host of the ISP 14. Most ASPS are unaware of the location of the ISP of the user. The QoSbyR value thus enables the ASP 19 to locate of the ISP 14. The ASP 19 also obtains the level of the QoS information from the QoSbyR value. The ASP 18 then sends the level of QoS information to the ISP 14 to request for allocation of resources to the service, as shown in step 39 of the FIG. 1. The allocation of resource includes priority in accessing the resource.

The ISP 14 afterward receives the level of QoS information and it initiates allocation of the resource, such as the routers 15 and 16, in step 40 of the FIG. 1. The user 13 then receives the service with the certain level of QoS of communication, as shown in step 41 of the FIG. 1.

The method allows the user 13 to request an arbitrary ASP to provide a service with a certain level of QoS. The ASP 18 is able to request for a level of QoS of the service from the ISP 14 of the user 13 on behalf the user 13. The ISP 14 does not need to have a prior agreement with the ASP 18. This implementation is simple and does not demand complex business agreements to be in place.

The method also has an inherent security benefit. The sending of the level of QoS information by the ASP directly to the ISP 14 avoids malicious nodes that may be located along a transmission path from change the level of QoS information.

In a generic sense, the resource requested by the ASP 18 can be a wireless interface of a wireless environment. The ISP 14 can allocate to the ASP 18 the resource that are present in its own domain or in neighbouring domain, if the ISP has a Service Level Agreement (SLA) with the neighbouring domain.

The QoSbyR value or QoSbyR information may be pre-provisioned in that the ISP 14 initiates a provision of the QoSbyR information to user 13. The provision may occur during network attachment of the user 13 to the ISP 14. The QoSbyR information may also be dynamically-provisioned in that the user 13 initiates a request for the QoSbyR information from the ISP 14.

The user 13 can pass the QoSbyR information to an arbitrary ASP. The QoSbyR information can be passed to more than one ASPS.

The QoSbyR information can have restrictions. These restrictions can be added at the time when the reference is created. The restriction can be in the form of a lifetime restriction, QoS parameter specific, such as maximum level of QoS, or access control restrictions to ensure that only certain ASP are able to interact with the ISP with respect to the specific end host.

The QoSbyR value can be transferred from the ISP 14 to the user 13 by means of existing protocols, such as HELD (HTTP Enabled Location Delivery), DHCP (Dynamic Host Configuration Protocol), or a newly defined protocol with similar characteristics.

The HELD is shown in M. Barnes, Ed., "HTTP Enabled Location Delivery (HELD)", January 2008, http://tools.ietf.org/id/draft-ietf-geopriv-http-location-delivery-04.txt.

The DHCP is shown in R. Droms, Ed., Bound, J., Volz, B., Lemon, T., Perkins, C., Carney, M., "Dynamic Host Configuration Protocol for IPv6 (DHCPv6)", July 2003, ftp://ftp.rfc-editor.org/in-notes/rfc3315.txt.

The QoSbyR can be passed on from the user 14 to the ASP 18 by means of existing application protocols, such as SIPS (Secure Session Initiation Protocol) or HTTPS (Hypertext Transfer Protocol over Secure Socket Layer) when accessing application service.

The HTTPS is shown in Rescorla, E., "HTTP over TLS", RFC 2818, May 2000, http://www.ietf.org/rfc/rfc2818.txt.

The SIPS is shown in Rosenberg, J., Schulzrinne, H., Camarillo, G., Johnston, A., Peterson, J., Sparks, R., Handley, M., Schooler, E., "SIP: Session Initiation Protocol", RFC 3261, June 2002, http://www.ietf.org/rfc/rfc3261.txt.

In summary, the above method comprises the step of obtaining a QoSbyR (QoS by reference) information from an ISP (Internet Service Provider) of a user by the user. The user then provides the QoSbyR information to an ASP (Application Service Provider) during a service request. The ASP afterward uses the QoSbyR information to locate the user's ISP and to request it to allocate resources to the service on behalf of the user.

FIG. 2 illustrates a URI (Uniform Resource Identifier) for delivering the QoSbyR information of FIG. 1 to the ASP 18.

A syntax of the URI is disclosed in Berners-Lee, T., Fielding, R., Masinter, L., "Uniform Resource Identifier (URI): Generic Syntax", January 2005, http://www.ietf.org/rfc/rfc3986.txt FIG. 2 shows a HTTPS (Hypertext Transfer Protocol over Secure Socket Layer) URI 22. The HTTPS URI 22 has a HTTPS scheme name 23, a host name 24, and QoSbyR information 25.

FIG. 3 illustrates another URI for delivering the QoSbyR information of FIG. 1 to the ASP 18. FIG. 3 depicts a SIPS (Secure Session Initiation Protocol) URI 28. The SIPS URI 28 comprises a SIPS scheme name 29, QoSbyR information 30, and a host name 31.

List of Abbreviations
    ASP Application Service Provider
    DHCP Dynamic Host Configuration Protocol
    HELD HTTP Enabled Location Delivery
    HTTP Hypertext Transfer Protocol
    HTTPS Hypertext Transfer Protocol over Secure Socket Layer
    IETF Internet Engineering Task Force
    ISP Internet Service Provider
    QoS Quality of Service
    QoSbyR Quality of Service by reference
    SIP Session Initiation Protocol
    SIPS Secure Session Initiation Protocol
    SLA Service Level Agreement
    URI Uniform Resource Location Identifier Reference Numbers
    10 computer network
    11 Internet Service Provider (ISP) network
    12 Application Service Provider (ASP) network
    13 user
    14 Internet Service Provider (ISP)
    15 router
    16 router
    18 Application Service Provider (ASP)
    22 HTTPS (Hypertext Transfer Protocol over Secure Socket Layer) URI
    23 HTTPS scheme name
    24 host name
    25 QoSbyR information
    28 SIPS (Secure Session Initiation Protocol) URI
    29 SIPS scheme name
    30 QoSbyR information
    31 host name
    35 step
    36 step
    37 step
    38 step
    39 step 40 step
41 step

The invention claimed is:

1. A method of using a computer network, the method comprises
requesting for a level of Quality of Service (QoS) of communication for a service of an Internet Service Provider (ISP) by a Application Service Provider (ASP),
the request is based on a Quality of Service by Reference (QoSbyR) information that is received by the ASP from a user,
the QoSbyR information comprises a ISP location information and a level of Quality of Service information.

2. The method of claim 1
characterized in that
the method comprises the further step of
requesting for the QoSbyR information by the user to the ISP.

3. The method of claim 1,
characterized in that
the method comprises the further step of
providing the QoSbyR information by the ISP to the user.

4. The method of claim 1,
characterized in that
the QoSbyR information provided using an URI (Uniform Resource Identifier) format.

5. The method of claim 1,
characterized in that
the method comprises the further step of
providing the QoSbyR information to the ASP by the user.

6. The method of claim 1,
characterized in that
the method comprises the further step of
allocating of a resource by the ASP to the service.

7. The method of claim 6,
characterized in that
the resource comprises resources of a neighbouring domain, wherein the ISP has a Service Level Agreement with the neighbouring domain.

8. The method of claim 1,
characterized in that
the method comprises the further step of
receiving the service with the level of QoS by the user.

9. A computer network that comprises
an Application Service Provider (ASP),
a Internet Service Provider (ISP), the ISP being communicatively connected to the ASP, and
a plurality of routers, the routers are communicatively connected to the ISP, wherein the ASP is configured to request a level of Quality of Service (QoS) of communication for a service of the ASP from the ISP based on a QoS by reference (QoSbyR) information from a user, the user is communicatively connected to the ASP, and the QoSbyR information comprises the level of QoS information and a location of the ISP information.

10. The computer network of claim 9
characterized in that
the ISP location information comprises a location information of a end host.

11. The computer network of claim 9,
characterized in that
the ISP location information comprises a location information of a QoS policy server.

12. The computer network of claim 9,
characterized in that
the level of QoS information and a location of the ISP information are in the form of an opaque reference.

13. The computer network of claim 9,
characterized in that
the ISP is configured to provide the QoSbyR information to the user.

14. The computer network of claim 13
characterized in that
the QoSbyR information is provided by the end host of the ISP.

15. The computer network of claim 9,
characterized in that
the ASP is further configured to receive the QoSbyR information from the user.

16. The computer network of claim 9,
characterized in that
the ISP is further configured to adapt the routers to provide the level of QoS for the service.

17. The computer network of claim 9,
characterized in that
the ISP is further configured to adapt at least one router of a neighbour domain to provide the level of QoS for the service.

* * * * *